Sept. 8, 1964    J. R. SHUPE ETAL    3,147,794
HEATING TOOL FOR USE IN JOINING THERMOPLASTIC ARTICLES
Filed June 10, 1963    2 Sheets-Sheet 1
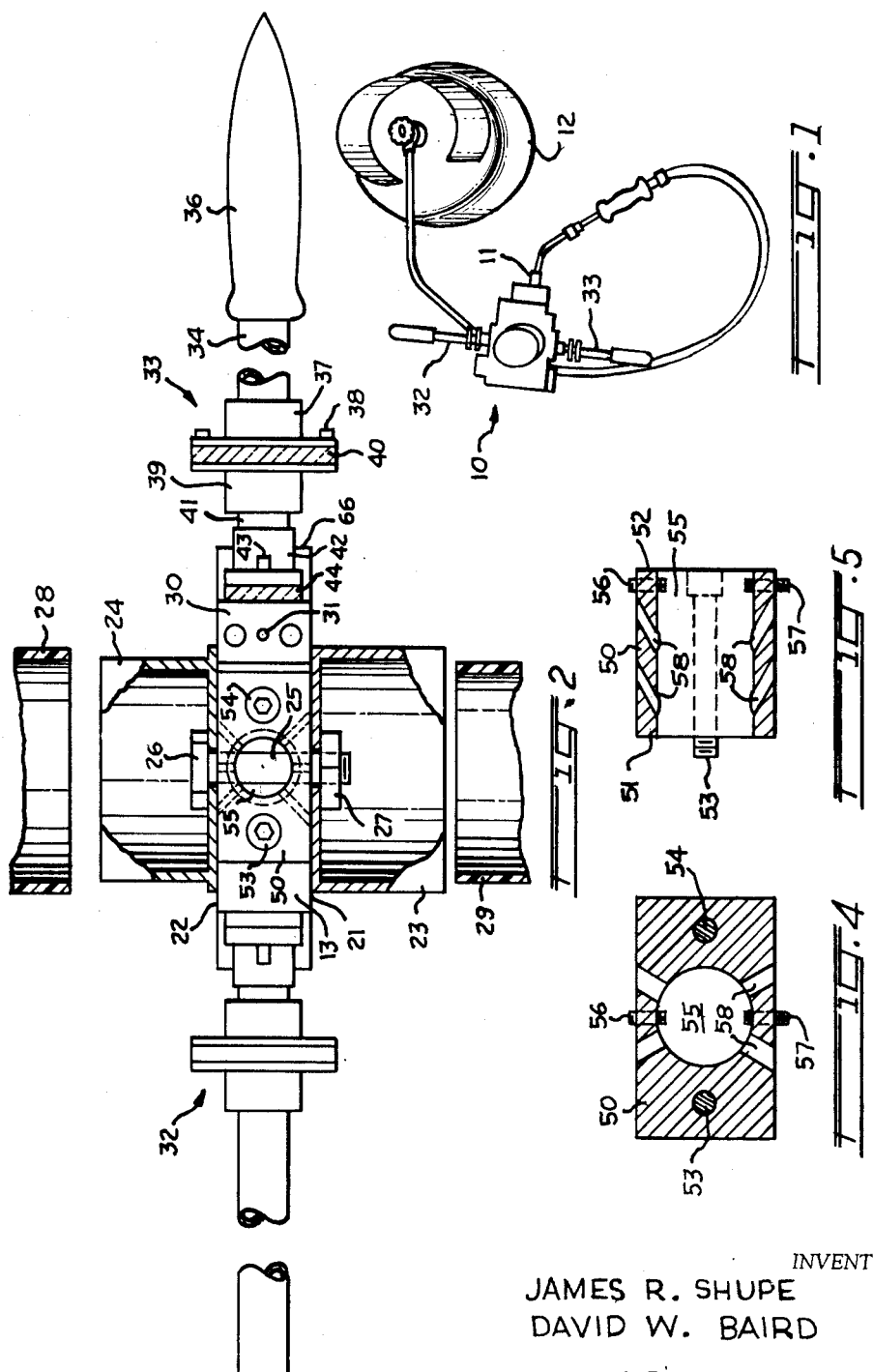
INVENTORS
JAMES R. SHUPE
DAVID W. BAIRD
BY W. E. Sherwood
ATTORNEY

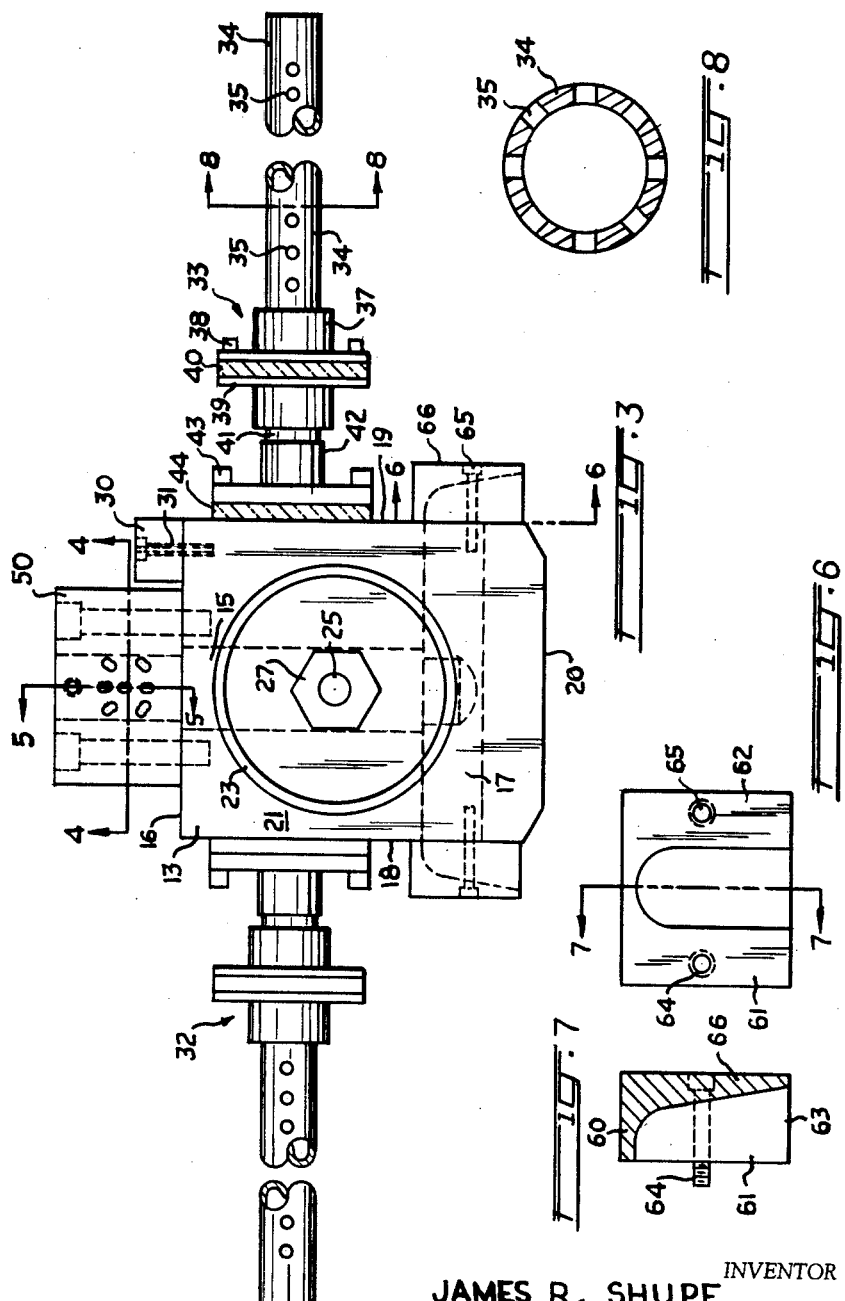

United States Patent Office 3,147,794
Patented Sept. 8, 1964

3,147,794
HEATING TOOL FOR USE IN JOINING
THERMOPLASTIC ARTICLES
James R. Shupe and David W. Baird, Lyndon, Ky., assignors to Tube Turns Plastics, Inc., Louisville, Ky., a corporation of Delaware
Filed June 10, 1963, Ser. No. 286,675
5 Claims. (Cl. 158—13.6)

This invention relates to the technique of joining thermoplastic tubular articles, such as pipes and fittings, to each other; and more particularly to an improved tool adapted for employment in this technique at locations where electrical energy is not readily available.

Electrically heated tools of this general type are frequently employed for bench-fabrication of piping assemblies comprising solvent-resistant thermoplastic materials, but when used in making final connections in the line, the necessity for long cords, field generators and the like often imposes a severe handicap on the workers. Conventional gas-fired tools such as soldering irons and the like are self-contained and portable, and are not limited to bench-fabrication techniques, but on the other hand, do not provide the necessary heat capacity, heat retention and weather-proof features required in a tool to be employed for the described purposes. It is a purpose of our invention to make available an improved tool which incorporates certain advantageous features of each of these two types of conventional heating tools and at the same time eliminates certain disadvantageous features characteristic of the same.

An object of the invention is to provide an improved gas-fired tool for use in joining thermoplastic tubular articles.

Another object is to provide a gas-fired tool of the type described and characterized by its relatively high heat capacity, its improved heat retention, and its ability to be used under adverse weather conditions.

A further object is to provide a gas-fired tool of the type described characterized by its efficient fuel burning and by its safe exhaust of combustion products.

Other objects and advantages will become more apparent as the description proceeds and when considered in conjunction with the accompanying drawings, in which FIG. 1 is a diagrammatic view of the gas-fired tool with the fuel supply connected thereto.

FIG. 2 is a side elevation view of the tool, partly in section and looking in the direction of flow of the gas, and with the fuel supply disconnected and the articles to be joined being shown schematically.

FIG. 3 is a plan view of the tool as shown in FIG. 2.

FIG. 4 is a sectional view of the air intake coupling taken on line 4—4 of FIG. 3.

FIG. 5 is a sectional view of the air intake coupling taken on line 5—5 of FIG. 3.

FIG. 6 is an interior face view of the exhaust deflector.

FIG. 7 is a sectional view taken on line 7—7 of FIG. 6, and

FIG. 8 is a sectional view of one of the supporting handles taken on line 8—8 of FIG. 3.

Referring now to FIG. 1 the invention comprises an improved gas-fired tool indicated generally at 10 and to which the nozzle 11 of a conventional blow torch, for example, the Turner Model LP 1866, can be detachably connected. This blow torch in turn is supplied with a gaseous fuel from a refillable portable tank 12 which may be equipped with carrying means (not shown) for attachment to the body of the user, and permitting movement into cramped spaces, climbing of ladders, and the like. It is contemplated that the weight of the entire unit will be in the order of 10–15 pounds when the tank has a fuel supply sufficient for an 8-hour period of work.

As shown in FIG. 2, the tool includes a massive block 13 of light weight metal, preferably aluminum, in generally parallelepiped form and comprising the body member whose heat capacity and heat retention characteristics form an important feature of the invention. This block is formed with an interior bore 15 extending therein from the end wall 16, which normally confronts the operator, and this bore forms an internal combustion chamber within the tool. As shown in dotted lines in FIG. 3, the distal end of the bore 15 communicates with another bore 17 extending at right angles thereto and forming a baffle chamber whose exhaust ports are at the side walls 18 and 19 of the body member and adjacent the other end wall 20 of that member. The exterior surfaces of the body member preferably are flat.

Rigidly attached to the body member on its opposite and larger sides 21 and 22 are a female die 23 and a male die 24 formed of metal and having substantial surface areas in intimate heat conducting contact with the body member. These dies conveniently may be held in place by a threaded bolt 25 extending across the combustion chamber bore and having a bolt head 26 engaging one of the dies and a nut 27 engaging the other die. The outer circumferential surface of the male die 24 is adapted to contact the inner surface of a first article, such as a thermoplastic fitting 28, and to soften the same preparatory to being joined by conventional techniques to the companion pipe 29, or second article, whose outer surface is softened by its contact with the inner surface of the female die 23. The tool is capable of attaining temperatures in the order of 750° F. and thus has a capability of handling the more heat-resistant types of plastics such as Teflon and Kynar. In general, the tool is adapted for use with any of the presently known types of solvent-resistant thermoplastic piping material. For the purpose of indicating the temperature of the tool at any given time, a metallic block 30 is suitably fastened to the exposed surface of wall 16 and has a well portion 31 into which the sensing element of a dial-type, direct-reading thermometer (not shown) is adapted to engage.

When a plurality of workers are not available, the tool may be supported manually by one worker, and for this usage a pair of elongated identical handles, attached at their proximate ends to the respective side walls 18 and 19 adjacent the center of equilibrium of the tool, and indicated generally at 32 and 33, are provided. Each of these handles comprises a tube 34 having an array of heat-dissipating vents 35 disposed both circumferentially and longitudinally thereof (FIGS. 3 and 8), this tube in one commercial form being fifteen inches in length. At its distal end the tube may mount a suitable rubber handle grip 36 and at its inner end be threaded for engagement within a flanged stub end 37 which is connected as by means of screws 38 to another flanged stub end 39 with a sheet of heat-shielding material 40 interposed therebetween. The stub end 39 likewise may embrace the threaded end of a short nipple 41 whose other end is received in a third flanged stub end 42 which is fastened as by screws 43 to the wall 19 of the body member 13 and with another sheet 44 of heat-shielding material between that wall and the stub end 42. By means of the described arrangement the handles give a useful combination of structural strength and heat insulation and will remain comfortable to the touch even though the tool may be at temperatures of 700° F. or higher. It will be understood that during bench-fabrication of the piping the tool need not be held by hand, but may be supported by clamping of one of the handles in a vice or the like.

With the foregoing description in mind reference now is made to FIGS. 4, 5, 6 and 7 showing important features of the invention contributing to the efficient combustion of the fuel and to the efficient heating of the tool. We provide a metallic air intake coupling 50 having a flat end 51 for contact with the end wall 16 of the block 13 and having recesses on its opposite end 52 for receiving the countersunk heads of screws 53 and 54, which in turn engage in threaded openings in the block 13. A longitudinal bore 55 extends through the coupling and communicates with bore 15 in the body member or block 13, the diameter of bore 55 being large enough to receive the end of nozzle 11 of the blow torch. Two diametrically arranged set screws 56 and 57 are mounted in the coupling and serve to hold the nozzle in preselected relation to the coupling when the apparatus is assembled for use. As best seen in FIGS. 4 and 5, a series of air intake holes 58 are formed through the coupling and slanted toward the direction of the flow of gas emerging from the nozzle of the blow torch. In one satisfactory form of tool, for example, a total of eighteen such holes are employed, being formed in both the upper and lower sides of the coupling. Accordingly, the draft established by that flow of combustible fuel draws in the necessary amount of air to support combustion and to burn the entire amount of gas so supplied from tank 12.

The mixture of burning gas and air to support its combustion then passes longitudinally of combustion chamber 15 and rapidly heats the body member 13 and the attached dies 23 and 24. The die supporting bolt 25 is formed of a suitable heat-resistant metal and the turbulence caused by its pressure is not detrimental to the combustion process. Upon reaching the far end of the combustion chamber the gases impinge upon the walls of the transverse baffle chamber and change direction, thus retaining within the body member substantially all of the generated heat and at the same time reducing the escape of flame from the vent ports.

As seen in FIGS. 6 and 7 we provide a pair of identical metallic deflectors for mounting at the respective vent ports of the baffle chamber. Each of these deflectors is formed with a concave space bounded by a top shoulder 60 and side shoulders 61 and 62, and with this space communicating with the exterior of the deflector as at its lower edge 63. These deflectors are mounted upon the sides of the body member by means of screws 64 and 65 having heads countersunk into the outer wall 66 of the deflector. By this arrangement the combustion products leaving the tool are directed away from the position normally occupied by the worker supporting the tool, thus insuring safety to the operator against inhaling of these products or contact therewith. Also, the combustion products are vented at points spaced a substantial distance from the location of dies 23 and 24, thus minimizing the likelihood of contact of those gases with the articles being brought to and removed from the tool.

The conventional blow-torch employed with the tool requires no modification for use in the combination, and by means of the adjustment of the usual valve on that torch for controlling the supply of gas, the temperature of the tool may be readily adjusted for the particular type of plastic material being handled. The mass of metallic material in heat-conducting contact and comprising the block 15, the dies 23 and 24, the air intake coupling 50, the deflectors, and the thermometer block 30 contributes to maintaining the dies at a high temperature and which characteristic is especially valuable when work is being conducted on cold or windy days. Other practical advantages will be apparent to those skilled in the art.

Having thus described our invention by reference to a specific form of a tool embodying the same, it will be understood that the invention may be embodied in other forms, within the scope of the appended claims, and without departing from the spirit of the invention.

What is claimed is:

1. A heating tool for use in joining a pair of thermoplastic tubular articles to each other and including, a metallic body member of generally parallelepiped form having a combustion chamber therein, a baffle chamber within said body member communicating with said combustion chamber, means attached to a first face of said body member for supplying fuel to said combustion chamber thereby to heat said body member and its attached parts during burning of the fuel, a first die mounted upon a second face of said body member, a second die mounted upon a third face of said body member, each of said dies being in intimate heat conducting relation to said body member and being dimensioned respectively to fit into the end of one of the pair of articles to be joined and around the end of the other such article, handle means attached to a face of said body member other than one of said first, second or third faces; and exhaust means communicating with said baffle chamber and arranged to vent combustion products from said body member in a direction away from said dies, said handle means and said fuel supply means.

2. A heating tool as defined in claim 1 wherein said first and second dies are metallic and are detachably joined to said metallic body member by a metallic fastening means passing through said body member.

3. A heating tool for use in joining a pair of thermoplastic tubular articles to each other and including, a metallic body member of generally parallelepiped form having a combustion chamber therein, a baffle chamber within said body member communicating with said combustion chamber, a metallic air intake coupling rigidly mounted upon a first face of said body member in intimate heat-conducting relation thereto and having a bore communicating with said combustion chamber, means for supplying fuel to said bore in said coupling, said coupling having a plurality of spaced air inlet holes through the wall thereof to supply air into said combustion chamber, a first die mounted upon a second face of said body member, a second die mounted upon a third face of said body member, each of said dies being in intimate heat conducting relation to said body member and being dimensioned respectively to fit into the end of one of the pair of articles to be joined and around the end of the other such article, handle means attached to a face of said body member other than one of said first, second, or third faces; and exhaust means communicating with said baffle chamber and arranged to vent combustion products from said body member in a direction away from said dies, said coupling, and said handle means.

4. A heating tool for use in joining a pair of thermoplastic tubular articles to each other and including, a metallic body member of generally parallelepiped form having a combustion chamber therein, a baffle chamber within said body member communicating with said combustion chamber, means attached to a first face of said body member for supplying fuel to said combustion chamber, a first die mounted upon a second face of said body member, a second die mounted upon a third face of said body member, each of said dies being in intimate heat conducting relation to said body member and being dimensioned respectively to fit into the end of one of the pair of articles to be joined and around the end of the other such article, a pair of handles mounted respectively upon fourth and fifth faces of said body member and having means adjacent their distal ends for manual grasping of the handles, said handles having heat shielding means interposed between their distal ends and their attachments to said body member thereby to reduce the flow of heat from said body member to the hands of the operator grasping said handles, and exhaust means communicating with said baffle chamber and arranged to vent combustion products from said body member in a direction away from said handles, said dies and said fuel supply means.

5. A heating tool as defined in claim 4 wherein said first and second dies are mounted upon opposite faces of said body member and said handles are mounted respectively upon opposite faces of said body member.

References Cited in the file of this patent

UNITED STATES PATENTS

| | | |
|---|---|---|
| 2,501,142 | Reichart | Mar. 21, 1950 |
| 2,692,641 | Woods | Oct. 26, 1954 |
| 2,807,317 | Penno | Sept. 24, 1957 |
| 2,819,756 | Schmidt | Jan. 14, 1958 |
| 3,053,311 | Nottage | Sept. 11, 1962 |

FOREIGN PATENTS

| | | |
|---|---|---|
| 514,970 | Great Britain | Nov. 22, 1939 |
| 1,185,682 | France | Feb. 16, 1959 |